3,467,142
FLOW DEVICE AND METHOD OF
MANUFACTURE THEREOF
Donn George Boyle, Lockport, and Robert Otto Osborn, Snyder, N.Y., assignors to E. I. du Pont de Nemours and Company, Wilmington, Del., a corporation of Delaware
Filed Aug. 8, 1967, Ser. No. 659,136
Int. Cl. F16l 9/18, 9/00
U.S. Cl. 138—111                5 Claims

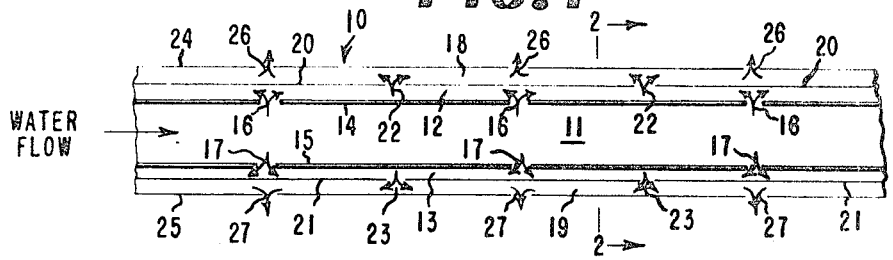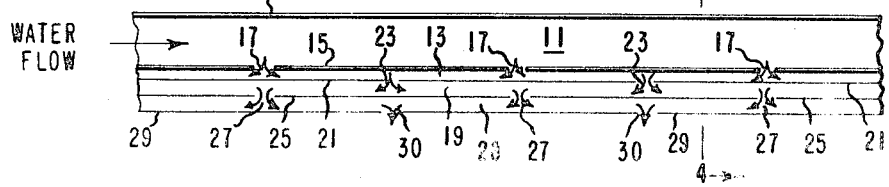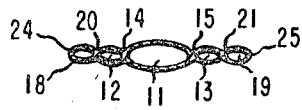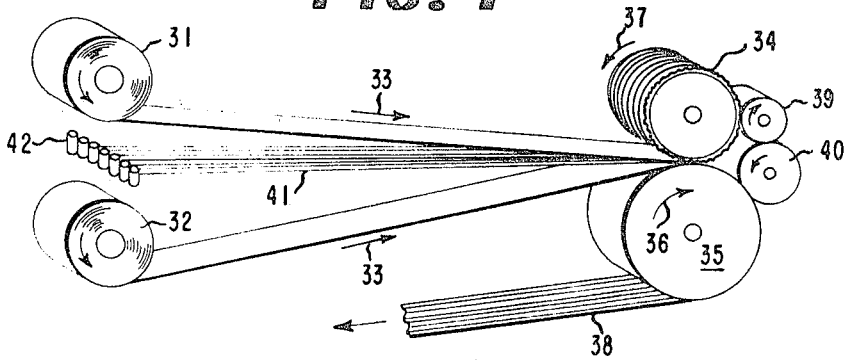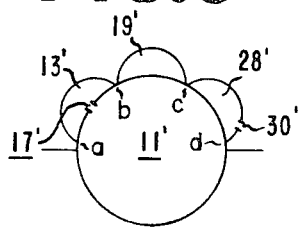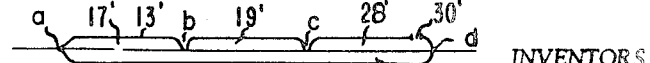
INVENTORS
DONN GEORGE BOYLE
ROBERT OTTO OSBORN
BY Claude L. Beaudoin
ATTORNEY United States Patent Office 3,467,142
Patented Sept. 16, 1969

ABSTRACT OF THE DISCLOSURE

An improved irrigation device for distributing water to agricultural soils constructed by sealing elongated strips of thin plastic films in a selected pattern to provide a relatively large main supply channel and attached lateral distribution channels, the lateral channels having a perimeter and length such that a large pressure drop of distributed water is provided between the main supply channel and the lateral channel exits.

---

The present invention relates to the distribution of fluids and, more particularly, is directed to a novel article of manufacture for distributing water for irrigation purposes and a method of manufacture thereof.

Conventional irrigation practices wherein water is transported to desired locations by means of open ditches suffers many disadvantages such as a high rate of evaporation of the water, excessive maintenance of the ditches in row crops and, in addition, salts from irrigation water are deposited by evaporation at the soil surface in such concentration that desirable plants cannot grow. Prior efforts to overcome some of these drawback as by the use of plastic tubes either above or below ground level wherein the water is released through small perforations in the wall of the tube have not been altogether successful. For example, in highly porous soils it is desired to supply water to growing plants continuously but at a very low rate to prevent loss by deep seepage. It is therefore necessary to provide perforations of very small diameter in the water supply tubes for maintaining a sufficiently low flow of water. It is found, however, that such small perforations easily become restricted or plugged within a short time primarily because of the accumulation of dirt and especially microscopic organisms or slime at the opening of the small diameter perforations, thus preventing the further flow of water. Accordingly, it is the principal object of the present invention to provide an improved irrigation device which is free of the difficulties outlined above for distributing water to agricultural soils.

The nature and advantages of the present invention will be more clearly understood from the following description and the several views illustrated in the accompanying drawings wherein like reference characters refer to the same parts throughout the several views and in which:

FIGURE 1 is a plan view of one form of the flow device of the present invention;

FIGURE 2 is a cross-sectional view taken along line 2—2 of FIGURE 1;

FIGURE 3 is a plan view of another form different from that depicted in FIGURE 1 of the flow device of the present invention;

FIGURE 4 is a cross-sectional view taken along line 4—4 of FIGURE 3;

FIGURE 5 is a cross-sectional view of yet another embodiment of the flow device of the present invention;

FIGURE 6 is a cross-sectional view of the flow device of FIGURE 5 when supplied with water;

FIGURE 7 is a schematic illustration in perspective of apparatus for practicing the method of fabricating the flow device of the present invention; and FIGURE 8 is a schematic illustration of the surface of heat-sealing roll 34 shown in FIGURE 7.

The flow device herein disclosed in illustration of the invention includes an elongated body of thermoplastic organic polymeric material having a plurality of interconnected flow passages or conduits therein arranged generally parallel to each other for the flow of water therethrough. Referring to FIGURES 1 and 2, the flow device 10 comprises a unitary structure of thermoplastic polymeric material having a main flow passage designated 11 extending the entire length thereof. The figures such as FIGURE 1 represent a section only of the flow device of the invention since the device is identical along its entire length and the sections of the device represented in the figures suffices to show the construction and salient features thereof. The flow device is normally closed at one end and is adapted to be connected at its other end by any suitable means such as mechanical clamping and coupling devices to a source of water (not shown). If desired, each end of the flow device could be connected to a water source. Additional flow passages 12 and 13 are provided immediately adjacent main flow passage 11. These flow passages are each disposed parallel to main flow passage 11 and each is separated from the latter by walls 14 and 15, respectively. Each flow passage 12 and 13 is in fluid communication with main flow passage 11 by means of flow openings 16 and 17, respectively, located opposite each other and spaced in walls 14 and 15 along the length of flow passage 11.

Still other flow passages such as 18 and 19 are provided immediately adjacent flow passages 12 and 13, respectively. Flow passages 18 and 19 are each disposed parallel to flow passages 12 and 13, respectively, and separated from the latter by means of walls 20 and 21, respectively. Flow passage 18 is in fluid communication with flow passage 12 by means of flow openings 22 located in wall 20 along the length of flow passage 12. In like manner, flow passage 19 is in fluid communication with flow passage 13 by means of flow openings 23 located in wall 21 along the length of flow passage 13. Each of flow passages 18 and 19 are sealed along their respective outer edge by means of walls 24 and 25. Flow openings 26 are provided in wall 24 along the length of flow passage 18. In like manner, flow openings 27 are provided in wall 25 along flow passage 19. The latter mentioned flow openings communicate directly with the exterior of the flow device, or with additional flow channels.

In operation, water from a suitable source (not shown) is introduced directly into flow passage 11. The water flows the entire length of flow passage 11 and is adapted to flow from flow passage 11 through flow openings 16 and 17 and into flow passages 12 and 13, respectively. From flow passages 12 and 13, the water is adapted to flow through flow openings 22 and 23 and into flow passages 18 and 19, respectively. From flow passages 18 and 19, the water is adapted to flow through flow openings 26 and 27, respectively, and into the environment surrounding the exterior of flow device 10 which may, for instance, be a suitable soil for growing flowers or edible crops or any suitable plant.

The device shown in FIGURE 3 is substantially similar to that above described except that it comprises a main flow passage 11 having flow openings 17 disposed along only one wall thereof, namely wall 15. Wall 14′ thereof, corresponding to wall 14 of the flow device depicted in FIGURE 1, is continuous along the entire length of flow passage 11 and unlike the flow device depicted in FIGURE 1 has no flow openings penetrating therethrough.

The embodiment of the flow device depicted in FIGURE 3 is provided with a flow channel 28 disposed adjacent and parallel to flow channel 19. Flow passage 28 is sealed along its outer edge by wall 29 which is also provided with flow openings 30 spaced along its length. The course of water flow through the device depicted in FIGURES 3 and 4 is generally similar to that above described for the device of FIGURES 1 and 2. In this case, however, water flows from flow passage 19 through flow openings 27 and into flow passage 28, and then from the latter through flow openings 30 and to the exterior of the flow device.

The main flow passage 11 of the flow device of the present invention should be sufficiently large to supply water continuously and at a uniform rate to the flow passages of the device without starving any one of them. The dimension of the flow device can be varied over a considerably wide range. The main flow passage 11 of the flow device of the present invention should be sufficiently large to supply the amount of water required for the entire system. The perimeter of each of flow passages 12, 13, 18, 19 and 28 is smaller than that of main flow passage 11, but in general is not smaller than about 0.1 inch nor larger than 0.5 inch. A salient feature of the flow device of the invention is that the ratio of the length-to-perimeter of the flow passages 12, 13, 18, 19 and 28 should be at least 10. The perimeter of the flow openings such as 16, 17, 22, 23, 26, 27 and 30 are preferably not less than that of the flow passages 12, 13, 18, 19 and 28. With this arrangement the length of each flow passage and its perimeter can be provided such that the amount of water issuing from the flow openings thereof can be controlled; that is, the longer the flow passage the greater is the pressure drop therethrough assuring a lower volume flow of water permitting use of relatively large flow openings such as 26, 27 and 30. With this arrangement a small amount of water can be delivered through each of the exit flow openings even though each may not be especially small because of the low pressure drop at that point. This arrangement is particularly suited to a system of continuous supply of water to growing plants.

Another embodiment of the flow device of the present invention is depicted in FIGURES 5 and 6 wherein 11' is the main flow passage having a plurality of flow openings 17' along its length. Another flow passage 19' is provided parallel to flow passage 13' and yet a third flow passage is provided adjacent flow passage 19'. Each of flow passages 13', 19' and 28' are disposed parallel to each other on the surface of main flow passage 11' and secured to the surface of the latter along line seals $a$, $b$, $c$, $d$. Line seals $b$ and $c$ are interrupted at intervals lengthwise thereof so as to provide flow openings adapted to permit fluid communication therebetween. Flow passage 28' is provided with flow openings 30' spaced along its length. The course of water flow through the device of FIGURE 6 is from main flow passage 11' to flow passage 13' by way of flow openings 17', and then from flow passage 13' to flow passage 19' by way of flow openings in line seal $b$, and then from flow passage 19' to flow passage 28' by way of flow openings in line seal $c$, and thence from flow passage 28' to the exterior of the flow device by way of flow openings 30'. The flow device assumes the cross-sectional configuration shown in FIGURE 8 when water is flowing therethrough. FIGURE 6 illustrates a self-regulating feature of the water distributing device. In this device it is observed that as the water flow increases the inner wall of the flow channel 13' is displaced toward the outer wall thereof thereby restricting flow through that channel. Thus, this arrangement is found to be substantially self-regulating.

In the preferred embodiment of the flow device of the present invention, the construction thereof is of films of polyethylene and preferably in a thickness of 2 to 5 mils. It is preferred to incorporate a filament within the flow passages of the device, particularly a thin copper wire because of its non-corrosiveness and its effective repression on growth and accumulation of microscopic organisms in the small diameter flow passages of the device.

The preferred plastic film for the construction of the flow device is polyethylene film because of its low cost and its ready heat sealability for fabrication into the desired structure. Other thermoplastic films can be used, such as those of polypropylene and of higher alpha olefins polymers, vinyl fluoride, vinyl chloride and vinylidene fluoride homopolymers and copolymers, polyesters such as polyethylene terephthalate, polystyrene homopolymers and copolymers as well as blends of the various polymers shown. A convenient method of fabrication involves heat-sealing the layers of film together. However, other methods of sealing can be employed such as the use of dielectric sealers, ultrasonics, solvent sealing, glue sealing and the like.

The flow device of the present invention can be used either on the surface of the soil or can be employed beneath the surface, depending upon the actual irrigation requirements. The plastic films may have incorporated therein stabilizers such as those which prevent degradation from ultraviolet irradiation, for example, particularly where the device might be used above ground.

In addition to incorporating in the flow device various algaecides such as metallic copper or copper sulfate or chlorine releasing agents in the flow passage in the form of filamentary material or incorporated in the plastic construction, other agents such as fungicides or rodenticides can also be so incorporated. Typical fungicides include Bordeaux mixture of copper sulfate and calcium hydroxide, hexachlorobenzene, phenyl mercury urea, cupric oxychloride sulfate, cupric 8-quinolate, n-dodecyl-guanidine acetate, 2,3-dichloro-1,4-naphthaquinone, zinc trichlorophenate and 2,4-dichloro-6-(O-chloroanilo)triazine. There may be incorporated in the flow device various rodenticides such as alpha-naphthyl thiourea, 2-pivalyl-1,3-indandione, sodium fluoroacetate and 3-(acetonyl-benzyl)-4-hydroxy coumarin and various fertilizing agents can be distributed to the growing plants through the water distributing flow device described herein. Further, with the device various biocides can be transported through the distribution channels to the soil surface or to the "root zone" area in a wide variety of horticultural and agronomic operations. In this way insecticides such as the chlorinated hydrocarbon types, organic phosphates and carbamates, more specifically, methoxychlor-1,1,1-trichloro-2,2-bis(p-methoxyphenyl)ethane, -O-ethyl O-p-nitrophenyl phenylphosphorothioate, -O,O-diethyl S-(ethylthio) methyl phosphorodithioate, methyl O-(methyl-carbamyl)thiolacetohydroxamate, methyl O-(carbamyl)thiolacetohydroxamate, 2,3-dihydro-2,2-dimethyl-7-benzofuranyl methylcarbamate, 2-methyl - 2 - (methylthio)propionaldehyde-O-(methylcarbamoyl)oxime, and related chemical types can be introduced to the "root zone" area. Likewise, nematocides such as 1,2-dibromo-3-chloropropane, sodium methyldithiocarbamate, O,O-diethyl O-(2-isopropyl-4-methyl-6-pyrimidinyl) phosphorothioate and O,O-diethyl-O-p-(methylsulfinyl) phenyl phosphorothioate, fungicides such as 1,4-dichloro-2,5-dimethoxybenzene, methyl bromide, sodium methyldithiocarbamate, pentachloronitrobenzene, N-trichloromethylthiotetrahydrophthalimide, disodium ethylenebisdithiocarbamate, zinc ethylenebisdithiocarbamate, manganese ethylenebisdithiocarbamate, tetramethylthiuramdisulfide, and various organic mercury compounds, herbicides and growth modifiers such as sodium methyldithiocarbamate, ethyl N,N-dipropylthiolcarbamate, S-propylbutylethylthiocarbamate, S-propyl-dipropylthiocarbamate, ethyl-N,N-diisobutylthiocarbamate, N-butyl-N-ethyl-alpha, alpha, alpha-trifluoro-2,6-dinitro-p-toluidine and N,N-dipropyl-alpha, alpha, alpha-trifluoro-2,6-dinitro-p-toluidine can be introduced into the soil in this way. The main advantage of the flow device of the present invention is that it provides a highly efficient means for distributing water for irrigation purposes. It is particularly useful for continuous delivery of water at a low delivery rate.

The method of manufacture provided by the present invention comprises placing two or more sheets of thin organic thermoplastic polymeric material in overlapping relation and heat-sealing said strips together in only selected areas as by contacting the juxtaposed sheets of polymeric material with an embossed roller provided with a surface having heated raised land portions whereby said heated raised land portions heat-seal the thermoplastic polymeric material adjacent thereto to provide a unitary structure of said sheets as above described having flow passages intermediate said heat-sealed portions.

The preferred method of fabricating the flow device of the present invention is illustrated in FIGURE 7 which shows two rolls of thermoplastic film material, preferably polyethylene, 31 and 32 disposed vertically of each other. The thermoplastic film material is led from each roll thereof in the direction of arrows 33 and fed into the nip of contacting rolls 34 and 35. Roll 34 is a heated heat-sealing roll having an embossed surface and roll 35 is a driven water-cooled roll which is rotated in the direction of arrow 36. Roll 34 is positioned in cooperative relation to roll 35 so that it rotates in the direction of arrow 37 in direct response to rotation of roll 35. The overlapping sheets of thermoplastic material are heat-sealed together in the nip formed between rolls 34 and 35 and the integral heat-sealed structure 38 continues around roll 35 on which it is cooled and led therefrom for further processing. Any suitable idler rolls as 39 and 40 may be employed for maintaining the integral heat-sealed structure 38 in intimate contact with driven water-cooled roll 35. Filaments 41, preferably of copper, from a suitable supply thereof 42 may be introduced between the sheets of thermoplastic polymeric material and between the heated raised land portions for positioning within the flow passages of integral heat-sealed structure 38 constituting the flow device of the present invention.

A typical cross-section of the surface of heated roll 34 is shown in FIGURE 8 which shows raised land portions 41 to 46, inclusive. The recessed area 47 between raised lands 41 and 44 thus corresponds to main flow passage 11 in the fabricated device depicted in FIGURE 1. Likewise, recessed areas 48, 49, 50 and 51 correspond to flow passages 13, 19, 12 and 18, respectively.

In an illustration of the manufacturing process, two polyethylene films each of 3 mils thickness were rolled under the heat-sealing roll 34 which had ridges or lands machined into its surface to seal parallel tubes. The heat-sealing roll surface is machined in such a way that there are gaps or spaces in the heat-sealing ridges or lands so as to leave unsealed portions where desired to provide transverse flow openings such as 16, 22 and 26 in FIGURE 1. In this instance the main flow channel 11 had a perimeter of one inch and the average perimeter of the other flow passages such as 12 and 18 in FIGURE 1 was 0.2 inch. Gaps or openings alternated along the sides of the central flow channel about every six inches and the water path from the opening in the central flow channel to the exit from the outer lateral channel to the soil was approximately 3 feet. A copper wire was incorporated in each of the flow channels to prevent growth of microorganisms in the water distributed therethrough. A 100 ft. long section of such a flow device was found to deliver about 25 gallons of water per day, operating at a head of 36 inches of water. The water pressure at the far end of the device was about 33 inches of water, illustrating the substantially uniform water head provided along the length of the distributing device.

What is claimed is:
1. An article of manufacture comprising a flow distributor adapted for connection to a source of water, said flow distributor having
   an elongated body of organic thermoplastic polymeric material of unitary construction having a main flow passage extending the entire length of said body and
   a plurality of smaller flow passages disposed adjacent and parallel to said main flow pasage and separated therefrom and from each other by wall means extending the entire length of said body, the average perimeter of said smaller flow passages being less than the perimeter of said main flow passage and not less than 0.1 inch, and said smaller flow passages being characterized by a ratio of length-to-average perimeter of at least 10;
   said flow passages being in fluid communication with each other by means of a plurality of flow openings in each of said wall means spaced along the length thereof.
2. The article of manufacture of claim 1 wherein the flow passages in said flow distributor have incorporated therein an agent effective for repressing the accumulation of microscopic organisms therein.
3. The article of manufacture of claim 2 wherein said agent is a filament positioned within the flow passages in said flow distributor.
4. The article of manufacture of claim 3 wherein said filament is of copper.
5. The article of manufacture of claim 4 wherein said organic thermoplastic polymeric material is polyethylene and said elongated body thereof is constituted of superposed sheets of polyethylene heat-sealed together at a plurality of locations along the length of said elongated body to provide a plurality of separated flow passages disposed parallel to one another and in fluid communication.

References Cited

UNITED STATES PATENTS

| | | |
|---|---|---|
| 2,449,731 | 9/1948 | Therrien. |
| 2,798,768 | 7/1957 | Babin. |
| 3,080,124 | 3/1963 | Rathmann _____ 239—450 |

M. HENSON WOOD, Jr., Primary Examiner

M. Y. MAR, Assistant Examiner

U.S. Cl. X.R.

47—56; 138—177; 239—450